June 26, 1956  H. MARTIN  2,752,073
GREASE GUNS
Filed Feb. 9, 1953
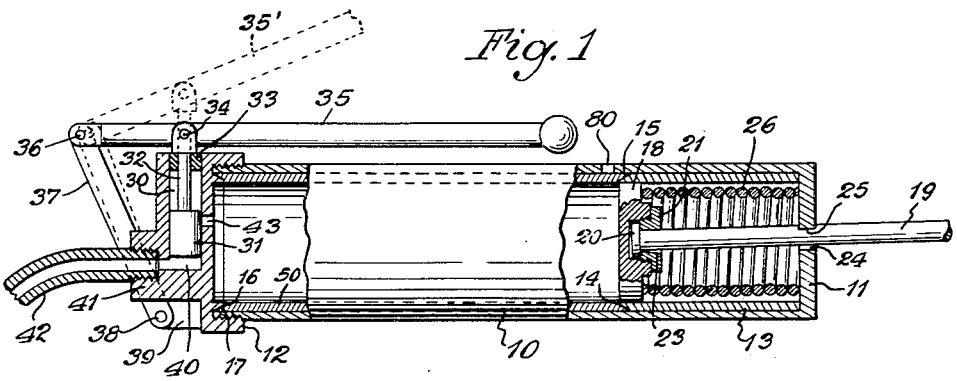
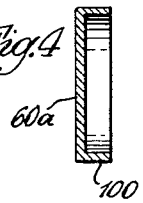  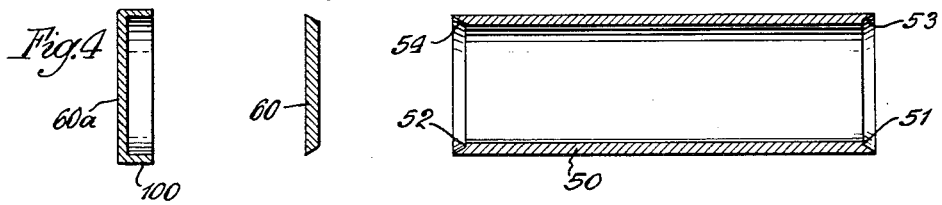
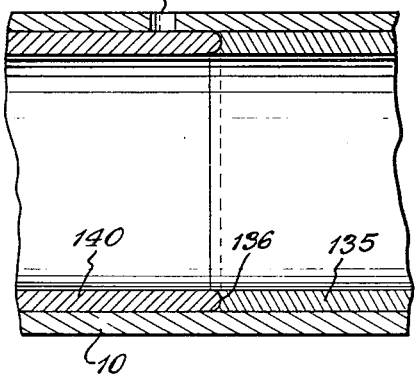 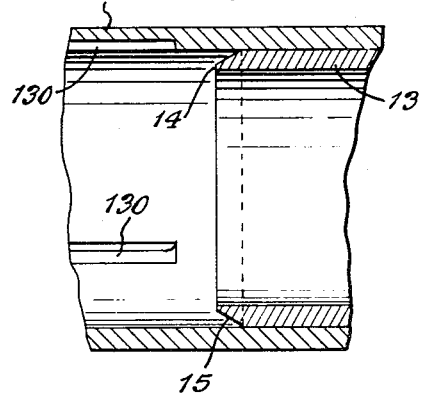
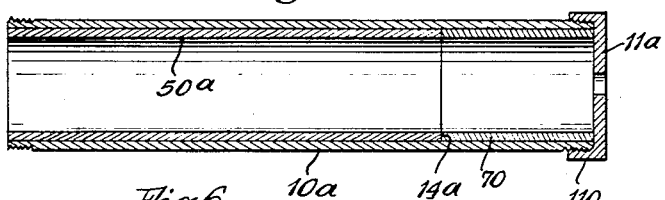 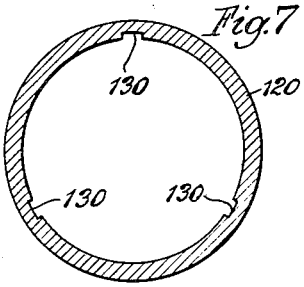
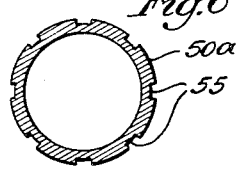
Inventor
Henry Martin
by Harry Hansen
Attorney

United States Patent Office 2,752,073
Patented June 26, 1956

2,752,073
GREASE GUNS

Henry Martin, Chatsworth, Ill.

Application February 9, 1953, Serial No. 335,643

7 Claims. (Cl. 222—326)

This invention relates to improvements in grease guns of the type which is charged by insertion of a grease cartridge. The application is a continuation-in-part of my copending patent application Serial No. 281,413, filed April 9, 1952, now Patent No. 2,717,724.

An object of the invention is to provide a grease gun of the general type described in said application, in which the interior shoulder in the gun barrel against which the inserted grease cartridge abuts, is formed by one end of an insert in the barrel.

Another object of the invention is to provide an insert of the type indicated which can readily be inserted in an existing grease gun of any type so that said gun, with a few additional changes, can be converted to a grease gun for use with a replaceable grease cartridge.

Other objects and advantages of the invention will be evident from the following description with reference to the accompanying drawings, in which:

Fig. 1 shows an elevation of a grease gun incorporating the invention, certain parts thereof being shown in a longitudinal section on the axis of the gun.

Fig. 2 is a cross-sectional view of an end cover for a grease cartridge.

Fig. 3 shows a longitudinal section of a grease cartridge.

Fig. 4 is a cross-sectional view of another type of cover for the grease cartridge of Fig. 3.

Fig. 5 shows a longitudinal section through the gun barrel and the cartridge of a modified embodiment, certain parts being omitted.

Fig. 6 is a cross-sectional view of a modified embodiment of the cartridge.

Fig. 7 is a cross-sectional view through a modified embodiment of the gun barrel.

Figs. 8 and 9 show partial longitudinal sections of two additional modifications.

In Fig. 1, a cylindrical gun barrel 10 is closed at its rear end by an end cover 11 and at its front end by a screw cap 12. The rear portion of the barrel 10 is provided with an insert 13 comprising a short open cylinder, the rear end of which is in engagement with the inner surface of the end cover 11.

The front end of the insert 13 forms an annular shoulder 14 in the barrel 10 and, in the embodiment shown in Fig. 1, said shoulder 14 is provided with an annular groove 15 therein. A similar shoulder 16 and groove 17 are formed on the inside of the screw cap 12 at the front end of the barrel 10.

A plunger 18 is mounted in the barrel 10 for reciprocatory movement longitudinally thereof, and said plunger 18 is provided with a plunger rod 19 having a knob or handle (not shown) on its rear end and a flange 20 on its front end, said flange 20 being held against the plunger 18 with some play by means of a nut 21 having a screw-thread connection with the plunger 18. The aperture for the rod 19 in said nut 21 is tapered, as shown at 23, so as to allow a limited transverse movement of the plunger rod 19.

The plunger rod 19 extends through an opening 24 in the end cover 11 and is provided with a lateral recess 25, the bottom of which can be brought into engagement with the edge of the opening 24 through a slight transverse movement of the rod 19, so as to lock the plunger rod 19 against longitudinal movement. A compression spring 26 rests with one end on the end cover 11 and with its opposite end on the plunger 18.

The screw cap 12 is provided, on its outside, with a well known mechanism for transmitting grease from the gun to the machine part to be greased. Said mechanism comprises a small transverse cylinder 30 containing a reciprocably mounted plunger 31 having a plunger rod 32 extending through a cover 33 to the outside. The plunger rod 32 has a pivot connection 34 with a lever 35, the front end of which has a pivot connection 36 with an arm 37 which, in turn, is provided with a pivot connection 38 with a lug 39 projecting from the screw cap 12.

From the inner end of the cylinder 30 a conduit 40 extends through a boss 41 to connect with a flexible tube 42 screwthreadedly connected to said boss 41. If desired, the arm 37 may be fork-shaped so as to straddle the boss 41, or it can be otherwise shaped in any suitable way to provide a symmetrical arrangement. An aperture 43 is provided in the screw cap 12 which connects the interior of the barrel 10 with the cylinder 30.

A cylindrical grease cartridge 50 is provided with an annular shoulder 51 at one end and with a similar shoulder 52 at its opposite end. Annular extensions 53 and 54, respectively, surround these shoulders 51, 52. It will be noted that the two ends of the cartridge 50 are identical, and the shoulders 51, 52 are spaced so that they engage the shoulders 14 and 16 in the grease gun, when the screw cap 12 is in position on the front end of the barrel 10. The extensions 53, 54 then extend into the grooves 15, 17 referred to above. The inner diameter of the cartridge is equal to the inner diameter of the insert 13 of the barrel 10. The grooves and extensions have a tapered wall, as shown.

The cartridge 50 man consist of any suitable material but is preferably made of cardboard or a similar material. The annular extensions 53, 54, by their engagement in the annular grooves 15, 17, provide a means whereby small irregularities in the cylindrical shape of the cartridge are corrected and prevented from interfering with the smooth working of the plunger 18 when the cartridge 50 is clamped in position in the barrel 10.

Fig. 2 shows a cover 60 fitting against the shoulder 52 in the cartridge 50 within the annular extension 54. A similar cover (not shown) is provided for the opposite end of the cartridge.

In order to enable the air trapped in the barrel 10 during the insertion of a filled cartridge 50 therein to escape, different means can be employed. In the embodiment of Fig. 1, the barrel 10 is provided with a small opening 80 in its side wall adjacent the shoulder 14 towards the front end of the barrel 10. The function of said opening 80 will be explained below.

When the grease gun described above is to be refilled, the lever 35 is moved to the position indicated in dotted lines at 35, whereby the plunger 31 is moved upwards so as to provide free communication between the interior of the gun barrel 10 and the atmosphere through aperture 43, cylinder 30, conduit 40, and the flexible tube 42. Since the opening 24 also provides free communication between the barrel and the atmosphere around the plunger rod 19, the plunger 18 can then readily be retracted to the position shown in Fig. 1 against the action of the spring 26. The plunger 18 is locked in this retracted position by engagement of the recess 25 in the plunger rod with the edge of the opening 24, as mentioned above.

The screw cap 12 is then removed and the cartridge 50 is pulled out of the barrel 10 through the open front end thereof. One end cover 60 is removed from a fresh filled grease cartridge 50, and said cartridge is inserted into the barrel 10 with the open end first. This insertion is carried out easily and without resistance, since the air in the barrel 10 between the plunger 18 and the cartridge can escape through the opening 80 in the barrel 10, until the rear end of the cartridge 50 reaches said opening 80 and covers it.

When the cartridge 50 has been completely inserted, the other end cover 60 is removed therefrom and the screw cap 12 is replaced onto the end of the barrel 10. Naturally, if desired both end covers 60 can be removed before inserting the cartridge.

The operation of the gun in use in identical with the operation of a prior art gun without a grease cartridge. In other words, the flexible tube 42 is secured to the machine part to be greased by known means (not shown), the plunger 31 is moved to a position in which it leaves the aperture 43 open, and the plunger rod 19 is released from its engagement with the edge of the opening 24. The spring 26 then drives the plunger 18 forward, until grease has been pressed out through the aperture 43 to fill the conduit 40. The spring 26 is relatively weak and is not able to press the grease into the place to be greased.

The lever 35 is moved to the position shown in full lines in Fig. 1, whereby the plunger 31 presses the grease in front of it out through the tube 42, at the same time closing the aperture 43. The procedure is repeated as necessary.

A modified type end cover for the cartridge 50 is shown in Fig. 4. This end cover comprises a circular disc 60a provided with an annular flange 100 to be slid in over the end portions of the cartridge 50 with the inside of the annular flange 100 in engagement with the outside of the cartridge 50.

A modified embodiment of the invention is illustrated in part in Fig. 5, only the barrel 10a without the screw cap 12 and the movable parts 18, 19, 26, being shown. The insert 70 is provided with straight cut ends, so as to form a straight shoulder 14a at its front end. The front screw cap (not shown) has a plane inside surface without any annular extensions of the kind indicated in Fig. 1. The end cover 11a consists of a cap provided with interiorly threaded flanges 110 for engagement with exterior threads on the barrel 10a.

The cartridge 50a is provided with exterior grooves 55 (Fig. 6) extending from end to end thereof and providing escape means for air during the insertion of the cartridge in the barrel. These grooves 55 will, of course, be closed at the front end by the front cover (not shown).

Instead of the grooves 55 in the cartridge, the gun barrel 120 may be provided with interior grooves 130, as shown in Fig. 7. These grooves 130 may extend from the front end of the barrel 120 to the insert 13 (or 70). In another embodiment, the grooves 130 extend rearwardly to a plane adjacent the shoulder 14, as shown in Fig. 8, in which case said grooves will be closed by the rear end of the cartridge shortly before it reaches said shoulder 14 during the insertion of the cartridge.

In the modification partly illustrated in Fig. 9, the barrel 10 has an insert 135 with a shoulder 136 of a concave shape. The end of the cartridge 140 is of corresponding convex shape, as shown.

The above detailed description is for exemplification only, without other influence upon the scope of protection than required by the limitations in the claims.

What I claim is:

1. In a grease gun, a barrel having a substantially cylindrical bore therein, a front end cover on said barrel, a rear end cover on said barrel outlet means in said front end cover, means for ejecting grease through said outlet means including a piston reciprocably mounted in said barrel and having a diameter less than the diameter of the cylindrical bore in said barrel, and a substantially cylindrical insert permanently secured in the rear end portion of the bore in said barrel, said insert having an outer diameter substantially equal to the diameter of the bore in said barrel and having an inner diameter substantially equal to the diameter of said piston, whereby said piston may be moved forwards from within said insert into a grease cartridge held in end abutting relation between said front end cover and the front end of said insert and having an inner diameter at least as large as the inner diameter of said insert.

2. A grease gun, comprising a barrel having a substantially cylindrical bore therein, a front end cover on said barrel, means on said front end cover for ejecting predetermined amounts of grease therethrough, manual means for operating said ejecting means, a rear end cover on said barrel, a substantially cylindrical insert permanently secured in the rear portion of said bore, said insert having substantially the same outer diameter as the inner diameter of said bore, a piston reciprocably mounted in said barrel and having a diameter substantially equal to the inner diameter of said insert, a piston rod secured to said piston and extending through said rear end cover, means for locking said piston rod in a retracted position, and a compression spring between said piston and said rear end cover to urge said piston forwards through said insert and into a grease cartridge held between said front end cover and the front end of said insert and having an inner diameter at least as large as the inner diameter of said insert.

3. A grease gun as set forth in claim 2, in which the front end of said insert is tapered to form a truncated conical surface having its apex towards the front end of said gun.

4. An insert for permanent mounting in a grease gun having a barrel with a substantially cylindrical bore for a removable grease cartridge therein, said insert comprising a cylindrical member having an outer diameter substantially equal to the diameter of said bore, the front end of said insert forming an annular inwardly extending shoulder in said gun barrel for abutting engagement with the rear end of the removable grease cartridge.

5. A grease gun as set forth in claim 1, including an annular groove in the front end surface of said insert.

6. A grease gun as set forth in claim 1, in which the front end of said insert is at least partly tapered to form an annular conical surface having its apex towards the front end of the gun.

7. A grease gun as set forth in claim 1, including an air escape opening in said barrel adjacent the front end of said insert.

References Cited in the file of this patent
UNITED STATES PATENTS

| | | |
|---|---|---|
| 1,269,438 | Hieatzman | June 11, 1918 |
| 1,389,405 | Williams | Aug. 30, 1921 |
| 1,446,894 | Foley | Feb. 27, 1923 |
| 1,540,182 | Outhier et al. | June 2, 1925 |
| 1,965,271 | Wharton | July 3, 1934 |

FOREIGN PATENTS

| | | |
|---|---|---|
| 324,451 | Italy | Feb. 2, 1935 |